United States Patent [19]

Matthews, III et al.

[11] Patent Number: 5,724,492

[45] Date of Patent: Mar. 3, 1998

[54] SYSTEMS AND METHOD FOR DISPLAYING CONTROL OBJECTS INCLUDING A PLURALITY OF PANELS

[75] Inventors: Joseph H. Matthews, III, Redmond; Steven Alfred Isaac, NE, Bellevue; William Hong Vong, Seattle, all of Wash.

[73] Assignee: Microsoft Corporation, Redmond, Wash.

[21] Appl. No.: 488,993

[22] Filed: Jun. 8, 1995

[51] Int. Cl.[6] .................................................. G06T 15/70
[52] U.S. Cl. .......................... 395/119; 395/355; 395/977
[58] Field of Search .................................. 395/121, 118, 395/100, 355, 976, 977, 119

[56] References Cited

U.S. PATENT DOCUMENTS

| 5,191,410 | 3/1993 | McCalley et al. | 348/13 |
| 5,303,388 | 4/1994 | Kreitman et al. | 395/159 |
| 5,341,466 | 8/1994 | Perlin et al. | 395/139 |
| 5,469,540 | 11/1995 | Powers, III et al. | 395/158 |
| 5,479,268 | 12/1995 | Young et al. | 358/335 |
| 5,485,197 | 1/1996 | Hoarty | 395/355 X |
| 5,559,549 | 9/1996 | Hendricks et al. | 348/6 |

OTHER PUBLICATIONS

Microsoft PowerPoint, Version 4.0, (printout of "Adding trnasistions to a slide show" from help) 1994.

*Primary Examiner*—Mark K. Zimmerman
*Attorney, Agent, or Firm*—Jones & Askew, LLP

[57] ABSTRACT

An interactive computer system displays informational and control objects consisting of multiple panels that facilitate browsing and selecting an element from a group of menus. Multiple menus are presented in a three-dimensional structure that contains one panel for each menu. Each panel is connected to another to form the three-dimensional object. When the menu is opened, the computer system provides high quality animation that illustrates the three-dimensional nature of the object and the relationship between the panels. The user can spin or rotate the three-dimensional object to reveal other menu panels. As each panel is revealed, the three-dimensional object is animated to show the spinning of the menu structure and the relationship between the menu panels.

19 Claims, 11 Drawing Sheets

SYSTEMS AND METHOD FOR DISPLAYING CONTROL OBJECTS INCLUDING A PLURALITY OF PANELS

TECHNICAL FIELD

The present invention relates to systems and methods for displaying control and data objects, and more particularly relates to methods for displaying three-dimensional control and data objects having multiple panels, while providing contextual clues regarding the three-dimensional nature of the objects.

BACKGROUND OF THE INVENTION

Graphic user interfaces (GUIs) for personal computers provide effective means for displaying various types of objects. The displayed objects include icons, which typically represent program modules (e.g., operating systems, application programs or data files) available in the computer, and various types of informational and control elements associated with functions carried out by the computer. For example, Microsoft Corporation's "WINDOWS" operating system is a graphic operating system that provides pull down menus along the top of each window and uses icons to represent program modules.

Pull down menus allow a user to select an item from a list of multiple, grouped items. Pull down menus are typically implemented by providing a menu bar along the top edge of a window. The menu bar includes the names of the menus that are available in that particular context. When the user selects one of the menus (using the keyboard or a pointing device such as a mouse), the menu opens to reveal the items or functions that are included in that menu. The user may then select the desired function from the list of functions included in the menu.

A significant advantage of pull down menus is that they provide contextual clues regarding the types of functions that may be performed in a given context. In addition, once a specific menu is selected, it opens to reveal a list of the specific functions that may be performed. Thus, pull down menus allow a user to browse the listed functions and choose the desired function. For example, when using a word processing program, the menu bar may include menus with titles such as "file," "edit," "format," and "font." The names of the menus indicate the general types of functions that may be performed. The presence of a "format" menu suggests that the user may use items in that menu to change the format of the text displayed in a document. When the format menu is selected, it provides a list of the functions (e.g., underline, bold, italic, etc.) that are available for selection by the user. It is apparent that pull down menus provide advantages over non-GUIs, which typically required the user to remember and type a specific function or command, without providing any clues to the user.

Although pull down menus provide valuable contextual clues and simplify the process of selecting an item from a list of multiple, grouped items, pull down menus require a fairly large amount of space on the display. This makes them less well suited for use in restrictive environments, such as hand held computers and interactive television systems.

Hand held computers (commonly referred to as personal digital assistants (PDAs)), typically include a small, touch sensitive liquid crystal display. The user interacts with the hand held computer by using a pen-like stylus to tap control objects on the display, or to "write" text on the display.

Because of the variety of functions provided by hand held computers and the somewhat cumbersome nature of the input stylus, it is desirable to display available functions as lists of grouped items, similar to the groups used in pull down menus. However, the small size of the display limits the amount of data that may be displayed at any one time.

The need to display a variety of informational and control objects is also found in interactive television (ITV) systems. Cable television systems, sometimes referred to as community-antenna television (CATV) systems were originally designed to distribute television signals in the "downstream" direction only, i.e., from a central "headend" location to multiple subscriber locations, also referred to as the "forward" path. The only user control required was a means for selecting the desired channel from among the many channels carried on the CATV system.

The advent of pay-per-view services and other interactive television applications has fueled the development of bidirectional or "two-way" cable systems that also provide for the transmission of signals from the subscriber locations back to the headend via an "upstream" direction or a "reverse" path. By upgrading CATV systems employing relatively limited bandwidth coaxial cable with broadband distribution networks having hybrid optical fiber/coaxial cable (HFC) configurations, multiple service operators (MSOs) can use the additional channels gained by this wider bandwidth network to provide many new subscriber services. This ever-expanding deployment of fiber optic technology supports the implementation of an "interactive network" that allows a subscriber to obtain desirable services or programming at a time and date specified by the subscriber. Indeed, it is feasible that this interactive network will have sufficient bandwidth to supply hundreds of channels of programming information, thereby leading to an explosion of program options available to subscribers. Potential subscriber services supported by this interactive network include Movies on Demand (MOD) or Video on Demand (VOD), interactive computing, shopping, entertainment, and other related services.

The delivery of a variety of interactive services via a broadband network distribution system raises the critical issue of defining an efficient mechanism for presenting both operation and program-related information to an audience of possible consumers representing diverse technological backgrounds and interests. From an ergonomic perspective, this "user interface" for such an interactive network should appeal to a "typical" viewer of standard broadcast television programs and should be easy for this mythical person to understand and to use. Because computer users reflect only a portion of the overall audience for interactive services, it is desirable that the features of this user interface to be based upon the assumption that the typical viewer is not familiar with user interface customs that are otherwise acceptable and understood by the computer literate community. In addition, the functions of the user interface should be controllable with a control device familiar with this typical television viewer, such as a hand held remote control unit. This user interface also should be readily readable from an acceptable viewing distance that typically separates the viewer from a television screen.

From a technical perspective, the delivery of video signals for presentation by a conventional television screen is limited by the display screen variations in the numerous models of televisions and the limitations inherent in the National Television Systems Committee (NTSC) standards for formatting video signals. The NTSC has established title and video safety standards to define a space along the television screen for readable text and images. The area of the television screen that is considered to support the most reliable presentation of images, which is known as the "safe title" area, is approximately the center 80% of the horizontal and vertical space of a television screen. Likewise, the area of the television screen that is considered to support the most reliable presentation of moving images, which is known as the "safe action" area, is approximately the center 90% of the horizontal and vertical space of a television screen.

Because these NTSC standards suggest that the video performance of even modern television monitors suffer from horizontal and vertical drift problems, the user interface for an interactive network should support the video safety standards to ensure that objects intended for display are actually presented to the viewer. However, it will appreciated that this implementation also effectively reduces "usable screen space" or display resolution for the user interface. This is dramatically different from the computer environment, where the entire screen of a computer monitor can predictably be used to present static and dynamic objects to a user.

The design of the user interface for an interactive network also must consider the well known phenomenon of "flicker" arising from the scanning of vertical and horizontal scan lines in a television screen. It would be desirable for the objects of a user interface for the interactive network to be drawn with lines having a pixel width of more than one pixel to reduce flicker and to support a more readable presentation of the displayed objects.

In summary, for restrictive environments such as interactive television networks and hand held computers, there is a need for a compact, efficient user interface that provides informational and control objects to the user. The user should be able to manipulate the object and select the desired elements using a non-alphanumeric input device such as a stylus or remote control unit. The user interface should require minimal space on the display in order to fit in the small area provided in hand held computers, and to comply with the NTSC video safety standards while providing controls that are easily readable on a variety of conventional television sets.

Thus, there is a need in the art for a user interface that facilitates the browsing and selection of an items from a group of multiple items, while requiring less space than pull-down menus. However, like pull-down menus, the user interface should provide contextual clues that enhance the user's ability to understand and operate the informational and control objects displayed as a part of the user interface.

SUMMARY OF THE INVENTION

The present invention satisfies the above described needs by providing systems and methods for displaying multi-paneled menu objects.

Generally described, the present invention provides a method for displaying a plurality of panels associated with a computing device, which includes an output device and an input device for providing input signals. The method of the present invention includes displaying an object that includes the plurality of panels, with the plurality of panels being joined together so that the object has a three dimensional appearance. The object is oriented so that a first panel of the plurality of panels is visible to the user. In response to a first input signal, the object is rotated so that a second panel of the plurality of panels is visible to the user.

In a similar aspect, the present invention provides a method for displaying a plurality of panels including information associated with an interactive device. The method includes displaying an object that includes a plurality of panels, with the object being oriented so that a first panel of the plurality of panels is visible to the user. In response to a first input signal, the object is rotated so that a second panel is visible. The process of rotating the object includes displaying graphic elements that depict a three-dimensional relationship between the first and second panels.

More particularly described, the present invention includes introducing the object by displaying it at an initial position, where it has an initial size. The object is subsequently displayed at a final position, where the object has a final size, which is larger than the initial size. The object is manipulated as it moves from the initial position to the final position in order to reveal the presence of each of the plurality of panels.

In another aspect, the present invention provides an interactive computer system for displaying a selectively controllable object including a plurality of panels. The interactive computer system includes a central processing unit (CPU), a memory device coupled to the CPU for storing program modules executed by the CPU, an output device coupled to the CPU for displaying information, and an input device coupled to the CPU for providing input signals. The CPU is operative to display the object with the plurality of panels joined together so that the object has a three dimensional appearance. The object is oriented so that one of the plurality of panels is visible. In response to a first input signal, the object is rotated so that a second panel is visible.

In another, similar aspect, the present invention provides an interactive computer system for displaying a selectively controllable object that includes a plurality of panels. The system includes a CPU, a memory device, an output device and an input device. The CPU is operative to display the object so that a first panel is visible on the output device. When a second input signal is received, the CPU is further operative to rotate the object so that a second panel is visible on the display. The step of rotating the object includes displaying graphic elements depicting a three-dimensional relationship between the first and second panels.

More particularly described, the interactive computer system of the present invention introduces the object by displaying it at an initial position, having an initial size. The object is subsequently displayed at a final position, having a final size. The CPU is operative to manipulate the object as it moves from the initial position to the final position so as to reveal the presence of each of the plurality of panels.

It is therefore an object of the present invention to provide a compact user interface that includes informational and control objects.

It is another object of the present invention to provide an improved control mechanism for the control and selection of an item from a list of multiple, grouped items.

It is another object of the present invention to provide a three-dimensional menu that provides many of the advantages of pull-down menus while requiring less space on a display.

It is another object of the present invention to provide a menu structure having multiple panels that takes up less space, and provides contextual clues as to the presence of the multiple panels.

It is another object of the present invention to provide a user interface control for browsing and selecting an element from a menu list and series of menus.

It is another object of the present invention to condense pull down-type menus so that menus appear on top of each other in the same space, while providing contextual clues as to the nature of the control object.

It is another object of the present invention to provide multi-panel menus for displaying informational and control elements to the user.

It is another object of the present invention to provide contextual clues that indicate the presence of multiple panels in the control object, thereby enhancing the user's ability to understand and operate the control.

It is another object of the present invention to provide opening and closing transitions that indicate the presence of multiple panels in the control object.

DETAILED DESCRIPTION OF THE PREFERRED EMBODIMENT

Figure 1:
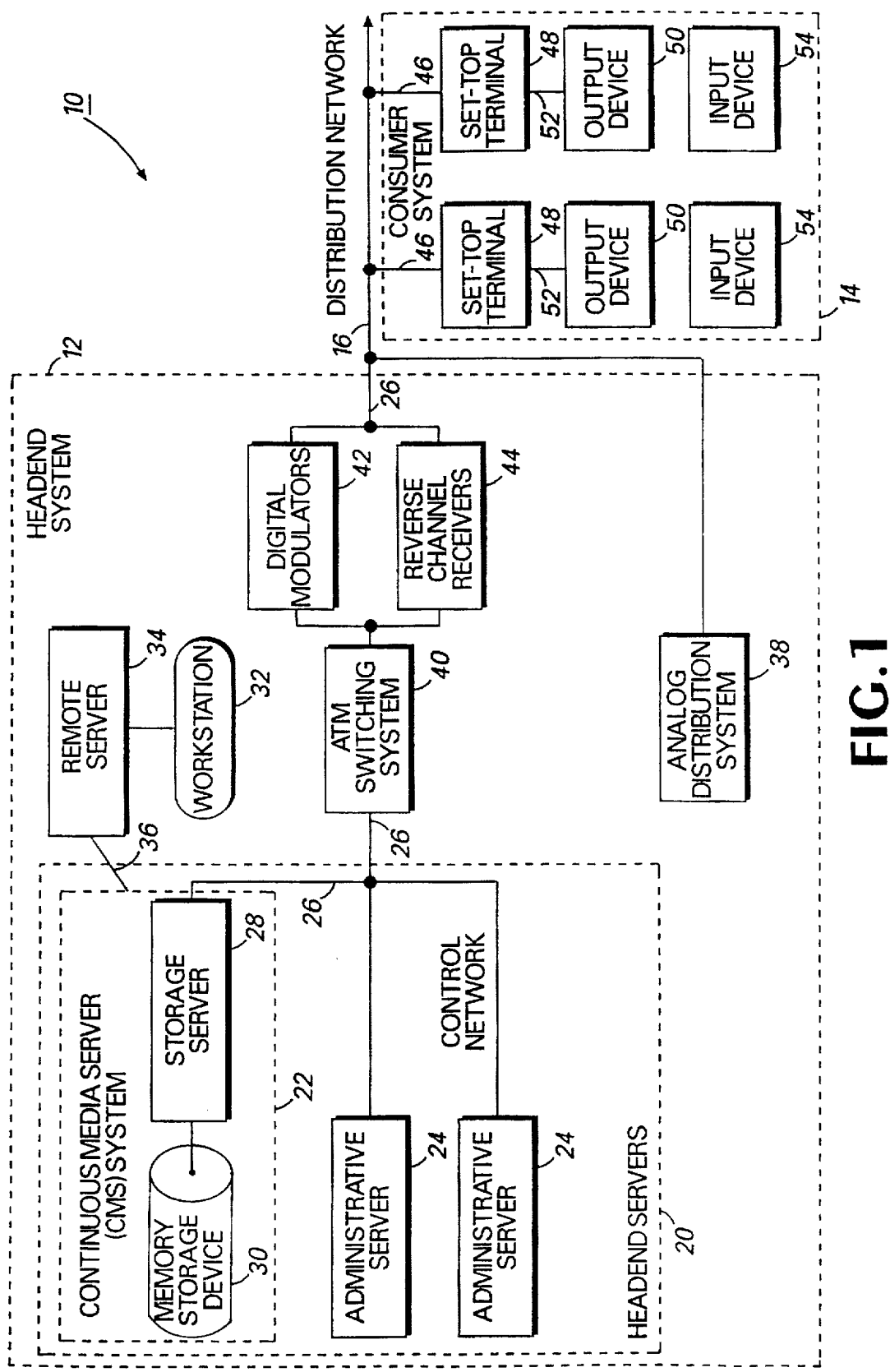
FIG. 1 illustrates an interactive network system.

The preferred embodiment of the present invention is directed to a user interface for an interactive network system that can deliver a variety of services, including entertainment, information, and transaction services, to consumers via an interactive broadband network. This user interface, which is typically presented via an output device, such as a display or monitor, can include one or more control items or images representing various informational and control functions associated with the operation of the interactive network. For example, the user interface can include control items representing functions for controlling a display of available program options. The present invention provides a method and system for selecting a visible control item and for supplying the user with an indication of other control items that are available for selection by the user. The innovative solution provided by this system address the requirements of limited display space available for displaying such control images, as well as the dynamic nature of programming information presented by the interactive network.

Although the preferred embodiment will be generally described as an interactive television system for delivering broadcast television programs and related information, those skilled in the art will recognize that the present invention also can be used to support the delivery of other forms of programming information, including radio, broadcast print, audio, games, computer software, including program modules such as application programs and operating systems, and other combinations of audio, video and/or computer software. Accordingly, it will be understood that programming information generally includes information transmitted electronically to entertain, instruct, educate, or inform the recipient, as well as program modules for supporting these services.

Likewise, those skilled in the art will also appreciate that the present invention can also be applied to the general purpose computing environment. Specifically, the present invention supports user interfaces for displaying control information with general purpose computer systems, including desktop computers, portable computers, and hand held computers, including personal digital administrators.

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now the drawings, in which like numerals represent like elements throughout the several figures, the present invention and the preferred operating environments will be described.

The Operating Environment

Referring to FIG. 1, an interactive network system 10 includes a headend system 12 for delivering programming information to and receiving instructions from a consumer system 14 via a "two-way" distribution network 16. The headend system 12 is the control center for collecting, organizing, and distributing the signals for all interactive network operations and the source for all programming information. The distribution network 16 transports signals carrying programming information and instructions between the headend system 12 and the consumer system 14. The distribution network 16 can include a world-wide public asynchronous transfer mode (ATM) compatible network with links to the Internet, third party service providers, and other wired and wireless communications networks. The consumer system 14 includes the equipment required for a consumer to receive programming information directly at his or her office or residence and to transmit requests and instructions to the headend system 12.

The headend system 12 can include a set of headend servers 20, including a continuous media server (CMS) system 22 and one or more administrative servers 24, to support various network functions, and a control network 26 linking these headend servers. The headend servers 20 can execute program modules, including service and application program software, to support the transmission of programming information and the reception of requests for such programming information.

It will be appreciated that the headend servers 20 are not necessarily located in one physical location, but can be linked by wired and/or wireless communications paths supplied by the control network. The control network 26 can be a local area network, a wide area network, or a combination of both types of networks. For the preferred embodiment, the control network 26 is implemented as an ATM-based network for routing digital data between the headend servers 20 and the distribution network 16.

The CMS system 22 is a server-based file storage and delivery system that can manage on-demand access to stored digitized data. On-demand access of digitized data is a particularly desirable characteristic of the CMS system 22 if the interactive network supports the delivery of Video on Demand (VOD) or Movies on Demand (MOD) services. The preferred CMS system 22 can supply digital data streams at a constant rate to numerous consumers of the consumer system 14.

The CMS system 22 includes one or more storage servers 28, which operate to retrieve and to transmit the digitized data as required by clients of the CMS system, i.e., the equipment of the consumer system 14. The digitized data, which typically comprises programming information, is maintained on one or more memory storage devices 30 connected to the storage servers 28. Each memory storage device 30 can be implemented as a SCSI hard disk drive, an optical storage system, or any other similar mass storage media. By spreading the data management operations across a group of storage servers and memory storage devices, user load can be balanced with the limited disk, network, and input/output (I/O) resources of the headend system. This also supports fault tolerance by replicating digitized data within the CMS system 22 to survive the failure of a storage server or a memory storage device.

To support the tasks of updating or revising programming information stored on a memory storage device 30 of the CMS system 22, a computer workstation 32 and a remote server 34 can be connected to the control network 26 via a communications link 36. This communications link allows a program distributor or supplier, which typically operates at a location remote from the CMS system 22, to transmit programming information for storage by one or more of the memory storage devices 30 and eventual distribution to consumers via the headend system 12. The communications link 36 can be implemented by either a wireless or wired communications system. For example, the communications link 36 can be constructed as a microwave link or as a conventional telephone link.

The administrative servers 24 of the headend system 12 can support a variety of services and applications associated with the interactive network system 10, including network security, monitoring, object storage, financial transactions, data management, and other administrative functions. The administrative servers 24 also handle the interactive service requests or instructions transmitted via the consumer system 14 by consumers. For an application involving a large base of consumers, an administrative server 24 is preferably dedicated to a particular service or function. For example, one or more servers can handle all consumer authorization requirements, whereas other servers can handle network management services, and so forth. These administrative servers preferably support the Simple Network Management Protocol (SNMP) to enable end-to-end network administration and monitoring.

The headend system 12 also can support the distribution of programming information and other services via an analog distribution system 38 that is coupled to the distribution network 16. This distribution of analog formatted signals can be handled by a separate headend system associated with a community antenna television (CATV) system. The headend of the CATV system typically supports satellite-delivered video and audio programs, over-the-air broadcast television station signals, and broadcast network signal feeds delivered by microwave and other communications systems.

The distribution network 16 is a two-way communications network that connects the headend system 12 to various community distribution points of the consumer system 14 and, in turn, to individual neighborhood nodes for delivery to consumers of services supplied by the interactive network system 10. The distribution network 16 comprises one or more downstream channels supporting transmissions from the headend system to the consumer system and one or more upstream channels for carrying transmissions from the consumer system to the headend system. This bidirectional communications network supports delivery of programming information via the headend system 12 to each consumer and the delivery of requests for programming information by a consumer to the headend system 12. The distribution network 16 can be implemented by a microwave distribution system, a telephone system, coaxial cables, optical fibers, or any combination of these delivery systems. However, the preferred distribution network is implemented by a combination of hybrid optical fiber/coaxial cable (HFC) and optical fiber-to-the-curb (FTTC).

Those persons skilled in the art will appreciate that the programming information delivered over the distribution network 16 typically comprises both video and audio signals. Programming information can be delivered in digital format, analog format, or a combination of both analog and digital formats. For the preferred embodiment, television-related programming is delivered as a stream of digital video and/or audio signals in a compressed digital data stream, including conventional MPEG-1 and MPEG-2 compressed video streams. Likewise, requests or instructions issued by consumers via the consumer system 14 are preferably formatted as digital signals.

The CMS system 22 and the administrative servers 24 are connected to the distribution network 16 via an ATM switching system 40. The ATM switching system 40 supports network switching requirements for delivery by the headend system 12 of digital data streams carrying multimedia content and the handling of interactive service requests from consumers.

Because the interactive network 10 is a two-way communications system, the ATM switching system 40 preferably connects to the distribution network 16 via modulation/demodulation devices. The downstream channels of the distribution network 16 can be connected to the ATM switching system 40 via digital modulators 42, whereas the reverse channels of the distribution network 16 are connected to reverse channel receivers 44.

Each consumer within a neighborhood node of the consumer system 14 is connected to the distribution network 16 via a subscriber drop cable 46, which is typically part of a local cable network administered by a multiple service operator (MSO). The drop cable 46 is typically a coaxial cable or optical fiber connected to a set-top terminal 48 or set-top box located at the consumer's location. This combination of the drop cable 46 and the set-top terminal 48 operates as a "tap" into the distribution network 16, and allows the consumer to (1) receive program modules and programming information distributing the headend system 12 and to (2) transmit requests or instructions to the headend system 12. For example, the set-top terminal 48 can accept and convert signals carrying programming information to a format compatible for presentation by an output device 50, such as a television or a computer system. This output device 50, which can connected to the set-top terminal via a conductive path 52 such as coaxial cable, preferably includes a receiver and a display or monitor for receiving and displaying programs and program-related information. Those skilled in the art will understand that the output device 50 can be implemented as a combination of separate components, such as a receiver and a monitor, or as a single component, such as a conventional television or a general purpose computer system.

Selected operating functions of the set-top terminal 48 can be controlled by an input device 54 capable of supplying input data to the set-top terminal 48. The input device 54 can be used to transmit command signals to the set-top terminal 48 and to input character-based data, such as text, for processing by the set-top terminal 48. For example, the input device 54 can be used to control the position of a display object presented by the output device or to enter text for conducting a service-related transaction supported by the interactive network 10. The input device 54 can be implemented as one or more devices for inputting data, including a hand held control, a keyboard, a mouse device, a game control, a joystick, a pen or stylus, a trackball, or a track pad.

For the preferred embodiment, the input device 54 is implemented as a hand held remote control unit capable of transmitting infrared signals carrying commands for controlling the operation of the set-top terminal 48. The remote control unit can include a directional keypad having distinct keys for allowing the user to control direction (up, down, left, right) and relative changes in volume or channel (increase or decrease), as well as absolute changes to channel value via a numeric key pad. The remote control unit and its functions are more fully described with respect to FIG. 3.

Figure 2:
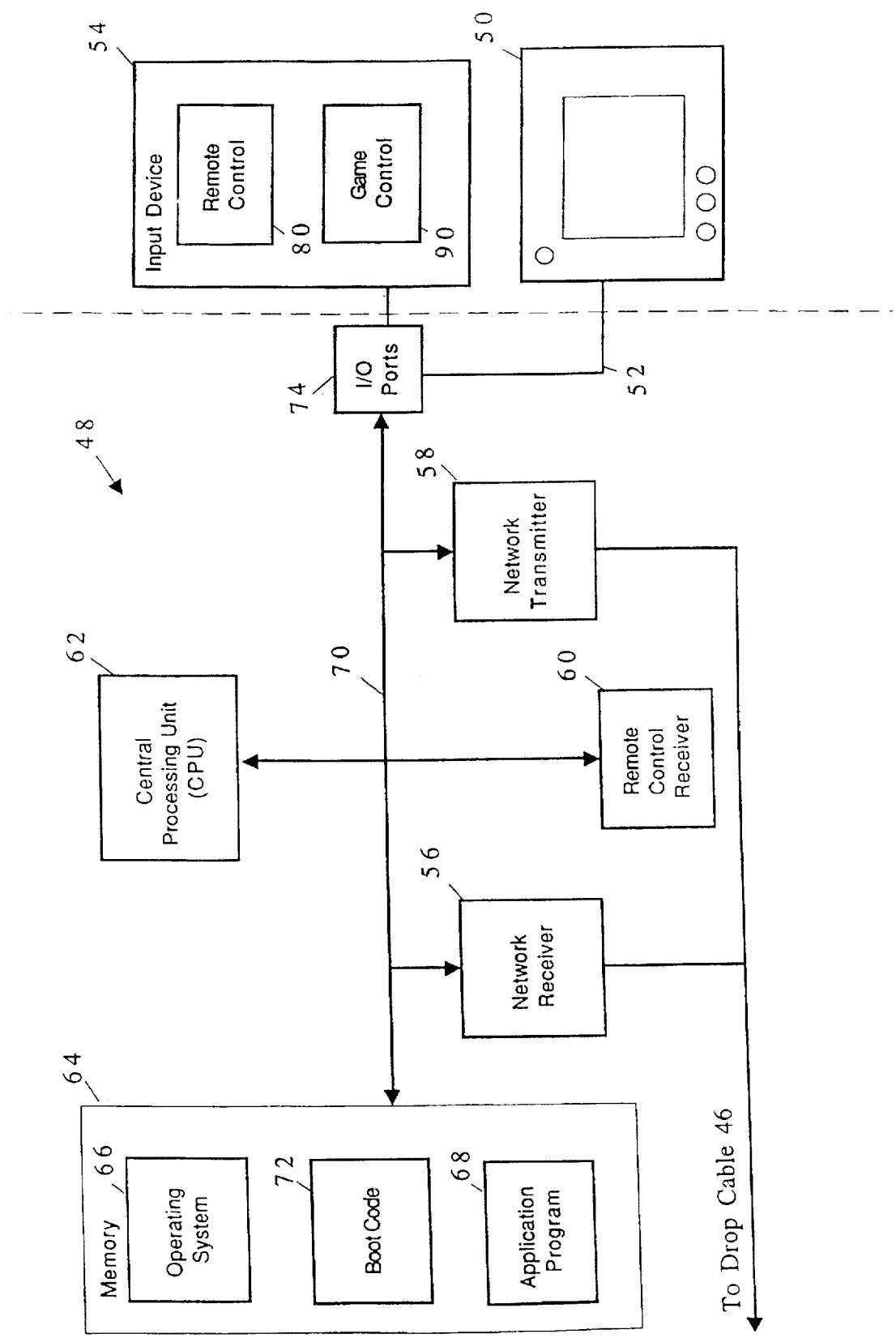
FIG. 2 illustrates a set top terminal, which forms a part of the interactive network system of FIG. 1.

FIG. 2 illustrates the basic components of the set-top terminal 48. The primary components of the set-top terminal 48 include a network receiver 56, a network transmitter 58, a remote control receiver 60, a central processing unit (CPU) 62, and memory 64. These components are connected by a system bus 70, which can carry control, address, and data signals. The network receiver 56 conducts tuning operations for receiving a selected channel of the interactive network 10 and decoding operations for decoding compressed digitized data supplied via the interactive network 10. For example, the set-top terminal 48 can include MPEG decoding capability for converting the compressed digitized data into standard National Television Standard Committee (NTSC) video signals for reception by a conventional television. The network transmitter 58 transmits requests for programming information and related instructions for processing by the headend system 12. The network receiver 56 and the network transmitter 58 can be connected to the distribution network 16 via the drop cable 46. The remote control receiver 60, which is preferably implemented as an infrared receiving device, can decode signals carrying the commands issued by the input device 54, such as a remote control unit 80.

The CPU 62, which is connected to the network receiver and transmitter 56 and 58, as well as to the remote control receiver 60, controls the operations of the set-top terminal 48 and supports the rendering of graphical images that form a part of the user interface. The CPU 62 is typically implemented by at least one microprocessor, such as the model 80486 or the "PENTIUM" microprocessor, manufactured by Intel Corporation, Santa Clara, Calif. The CPU 62 communicates, by means of control, address, and data signals, with the remaining components of the set-top terminal 48 through the system bus 70. The CPU 62 operates in conjunction with the operating system 66 to retrieve, process, store, and display data. It will be appreciated that the processing functions of the CPU 62 may be divided among two or more microprocessors to support the presentation of a graphics-intensive user interface. For example, a microprocessor may be dedicated to control operations associated with the bi-directional communications with the headend system 12, whereas another microprocessor may be dedicated to the generation of graphics.

The memory 64, which is connected to the CPU 62, is useful for storing one or more program modules and data associated with set-top terminal operations. Program modules stored in the memory 64 can include operating system 66 and one or more application programs 68. The memory 64 can be implemented as a combination of dynamic memory, such as random access memory (RAM), and static memory, such as read only memory (ROM).

The operating system 66 comprises a set of computer programs that control the internal functions of the set-top terminal and support the execution of other program modules, including application programs 68. The preferred operating system 66 supports a graphics-based presentation of program-related information, including control items that visually represent control functions of the operating system and other program modules. A control item is any visual image that can be manipulated by the user to perform an operation. The operating system 66 can receive and interpret input data supplied by the input device 54, as received by the remote control receiver 60. As described in more detail below, a user can "select" and "launch" control items by the use of the input device 54 in a manner similar to the computer arts.

For the preferred set-top terminal 48, the memory includes a ROM containing at least a portion of program module representing "boot code" 72 for initializing the operations of the set-top terminal 48. Upon power-up of the set-top terminal 48, the boot code 72 initiates a request for the headend system 12 to download certain program modules, including the operating system 66 and one or more application programs 68. The program modules can be stored within the memory 64 of the set-top terminal 48. This downloading process allows the headend system 12 to easily update the program modules used in set-top terminals 48 throughout the interactive network 10. For example, the application programs 68 may be maintained within the set-top terminal 48 only during actual use of the features of these programs; otherwise, these application programs are maintained at the headend system 12. Thus, it will be appreciated that the preferred set-top terminal 48 relies heavily upon data storage mechanisms located at the headend system 12 rather than within the set-top terminal 48 itself.

The set-top terminal 48 can be connected to a peripheral device via input/output (I/O) ports 74. The I/O ports 74 support the connection of the system bus 70 to a connected peripheral device. For example, the output device 50 can be connected to the I/O ports 74 via a conductor 52. Likewise, an input device 54, such as a game control 90, can be connected to the I/O ports 74. In contrast to the remote control unit 80, which communicates with the remote control receiver 60 via a wireless communications link, other types of input devices 54 are typically connected to the I/O ports 74 via a cable. Nevertheless, those skilled in the art will appreciate that input devices 54 can communicate with the set-top terminal 48 by use of either wireless or wired communications links.

Generally, when a user first powers-up a set-top terminal 48, the set-top terminal 48 contacts the headend system 12 and requests the downloading of certain program modules, including the operating system 66. In response to loading these program modules, the set-top terminal 48 enters a stand-by mode to limit power consumption and awaits a command signal initiated by a user pressing a key or button on an input device 54, such as a remote control unit 80. In this stand-by mode, the set-top terminal can communicate with the headend system and can respond to administrative requests transmitted by the headend system 12. In the event that a user tunes to an interactive channel (typically by pressing the appropriate function key of the remote control unit), the set-top terminal 48 changes modes and enters the active mode. In the active mode, the set-top terminal 48 communicates with the headend system 12 to process the instructions transmitted by the remote control unit. For example, the set-top terminal 48 responds to a command requesting programming information by forwarding this instruction to the headend system 12 via the drop cable 46 and the distribution network 16. The headend system 12 responds by retrieving selected programming information from the CMS system 22 and transmitting the selected programming information via the return path provided by the distribution network 16 and the drop cable 46. The set-top terminal then supplies this programming information in the proper format for presentation by the display 50.

Figure 3:
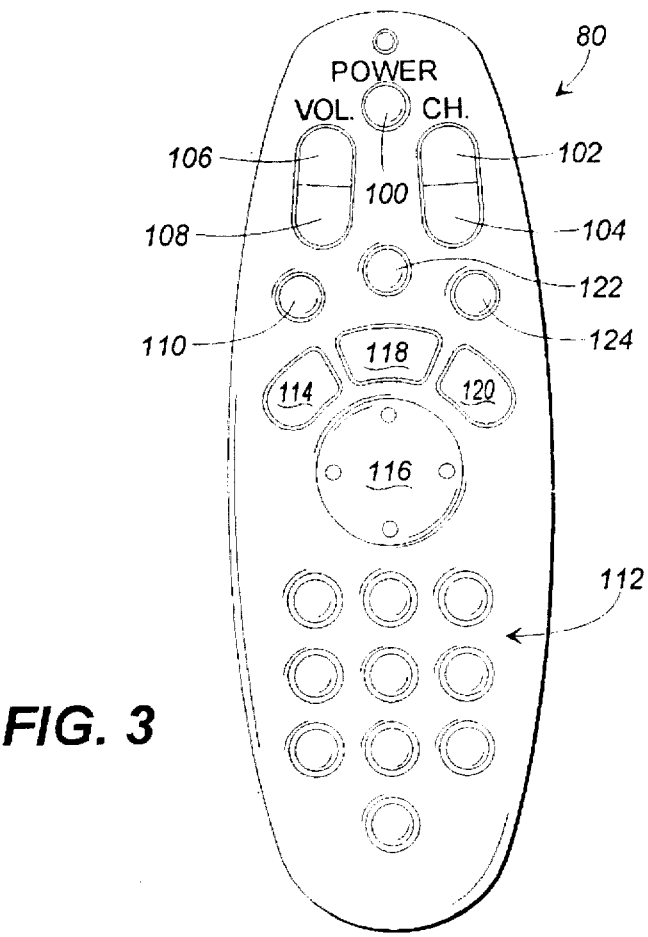
FIG. 3 illustrates the preferred remote control unit for use with the set top terminal of FIG. 2.

FIG. 3 illustrates the preferred remote control unit 80, which is used to transmit commands to the set-top terminal 48. The remote control unit 80 includes a variety of keys that are common to remote control units for use with conventional television sets. These include power on/off 100, channel up 102, channel down 104, volume up 106, volume down 108, mute 110, and a 10 digit numeric keypad 112.

The preferred remote control unit also includes keys that are specifically related to preferred interactive system. A menu button 114 is used to open and close on-screen menus, such as a channel manger object. A directional control 116 is a rocker switch that is used to manipulate the channel manager and select specific items by moving a cursor up, down, left or right. An action button 118 is used to launch a selected function. A help key 120 is to initiate on-screen help. An "A" button 122 and "B" button 124 are used to select specific options that are provided in some contexts.

Figure 4:
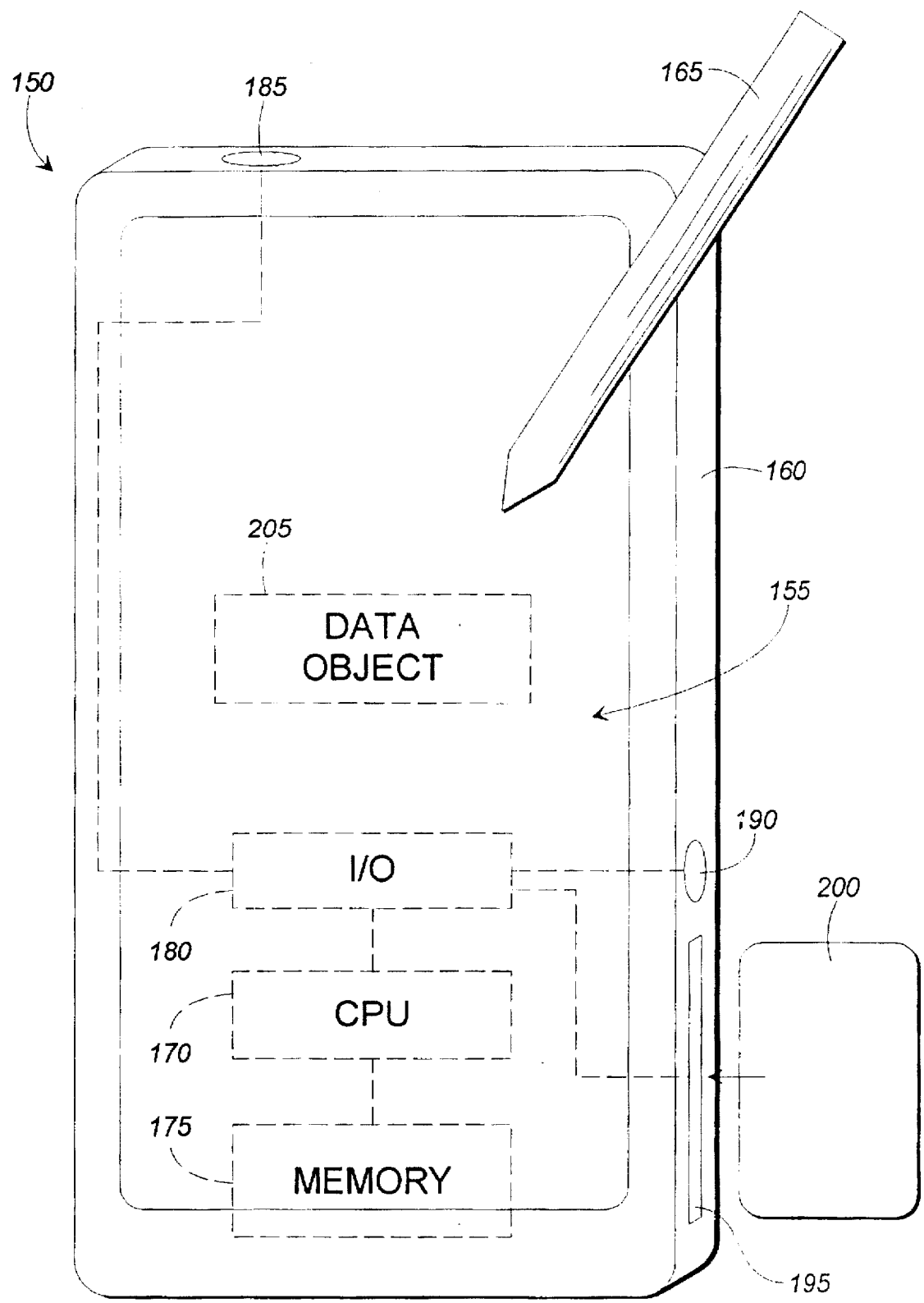
FIG. 4 illustrates a hand held pen-based computer.

Turning now to FIG. 4, an alternative operating environment will be described. FIG. 4 illustrates a hand held pen-based computer 150. The hand held computer 150 includes various components, which are represented graphically for purposes of illustration. A rectangular liquid crystal display 155 occupies the front surface of a housing 160, and provides a surface upon which graphic images are displayed. Preferably, the LCD display 160 is touch sensitive. A stylus 165 that is held by a user is used to write, draw, or gesture upon the surface of the display 155 to allows user interaction with the computer.

The computer 150 is preferably constructed around a central processing unit (CPU) 170, a memory 175, and an input/output (I/O) circuit 180, all of which are contained within the housing 160, but which are shown in FIG. 1 for purposes of illustration. It will be understood that the I/O circuit 180, CPU 170, and memory 175 are those typically found in most general purpose computers. Indeed, the computer 150 is intended to be representative of a broad category of data processing devices. Thus, although there is no keyboard or other pointing device shown in FIG. 4, it will be understood that such types of computer systems are also suitable for use with the present invention.

The I/O circuit 180 is used to communicate information in appropriately structured form to and from other portions of the computer 150. For example, the I/O circuit drives an optical port 185, which is employed to communicate information optically to similar optical devices. The I/O circuit further connects to a serial port 190, which allows electrical connection of peripheral devices such as communication lines to a desktop personal computer system, modem, or other device. The I/O circuit further connects to a PCMCIA slot 195 which allows usage of a PCMCIA memory card or other peripheral PCMCIA device such as shown at 200.

The display 155 is shown coupled to the I/O circuit 180 and is used to display images, data, etc. generated by the CPU 170 in accordance with the present invention. The display, as will be known to those skilled in the art, is a rectangular array of picture elements, or "pixels", beginning at an origin (x=0, y=0) and extending across the width of the display screen to the rightmost extent (x=W), and downwardly to the lowermost extent (y=H) of the display screen.

A data object 205 is shown on the display 155. In the example of FIG. 4, the data object 205 is a string of text that is displayed in a rectangular region on the display screen 155 defined by the dotted box. It will be understood that the dotted box is not displayed on the display screen of the computer, but merely signifies an illustrative data object— the text contained with the rectangular boundaries shown— for purposes of ease of understanding. Moreover, the invention contemplates various types of data and control objects, including informational and control items similar to those supplied in conventional pull down menus.

In a hand held computer, two particular actions of the stylus relative to the screen are contemplated—a tap and a drag. A tap occurs when a user quickly places the tip of the stylus within the boundary associated with a data or control object and lifts it up, tapping the surface lightly on the display screen. A drag occurs when the user places the tip of the stylus into the region associated with a data or control object and, rather than lifting the stylus, leaves the tip of the stylus in contact with the surface of the display screen and moves the stylus along a path on the surface of the screen.

Although an interactive television system and hand held computer have been described in some detail, those skilled in the art appreciate that the principles of the present invention are applicable to other types of interactive computing environments, including, but not limited to, general purpose computers.

The Preferred Methods For Displaying Data and Control Objects

Figure 7:
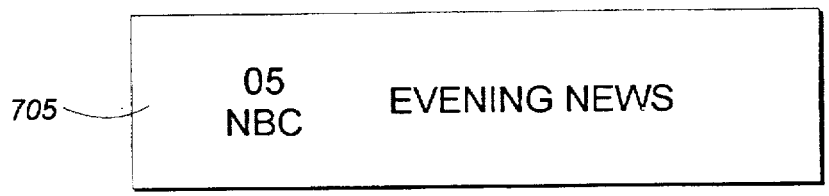
FIG. 7 illustrates a transition between panels on the channel manager of FIG. 5.
Figure 7:
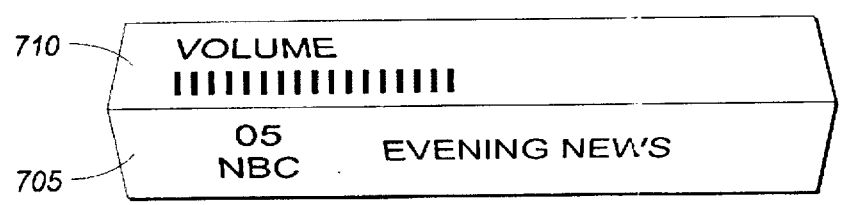
Figure 7:
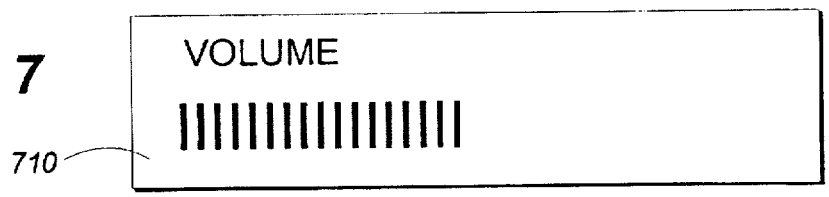
Figure 5:
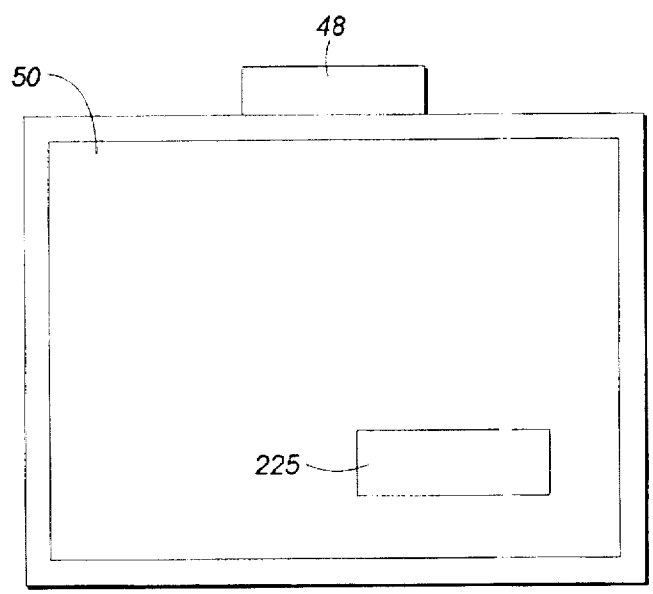
FIG. 5 illustrates the position of a channel manager object on a monitor, which forms a part of the interactive network system of FIG. 1.
Figure 6:
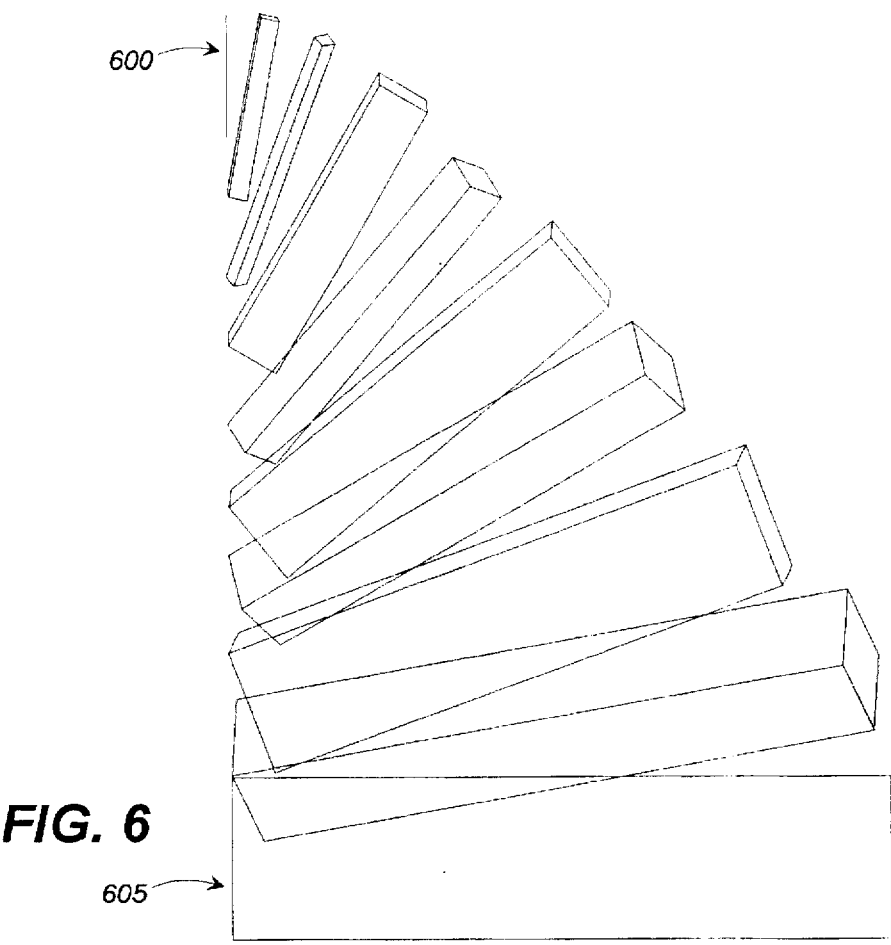
FIG. 6 illustrates an open transition for the channel manager of FIG. 5.
Figure 8:
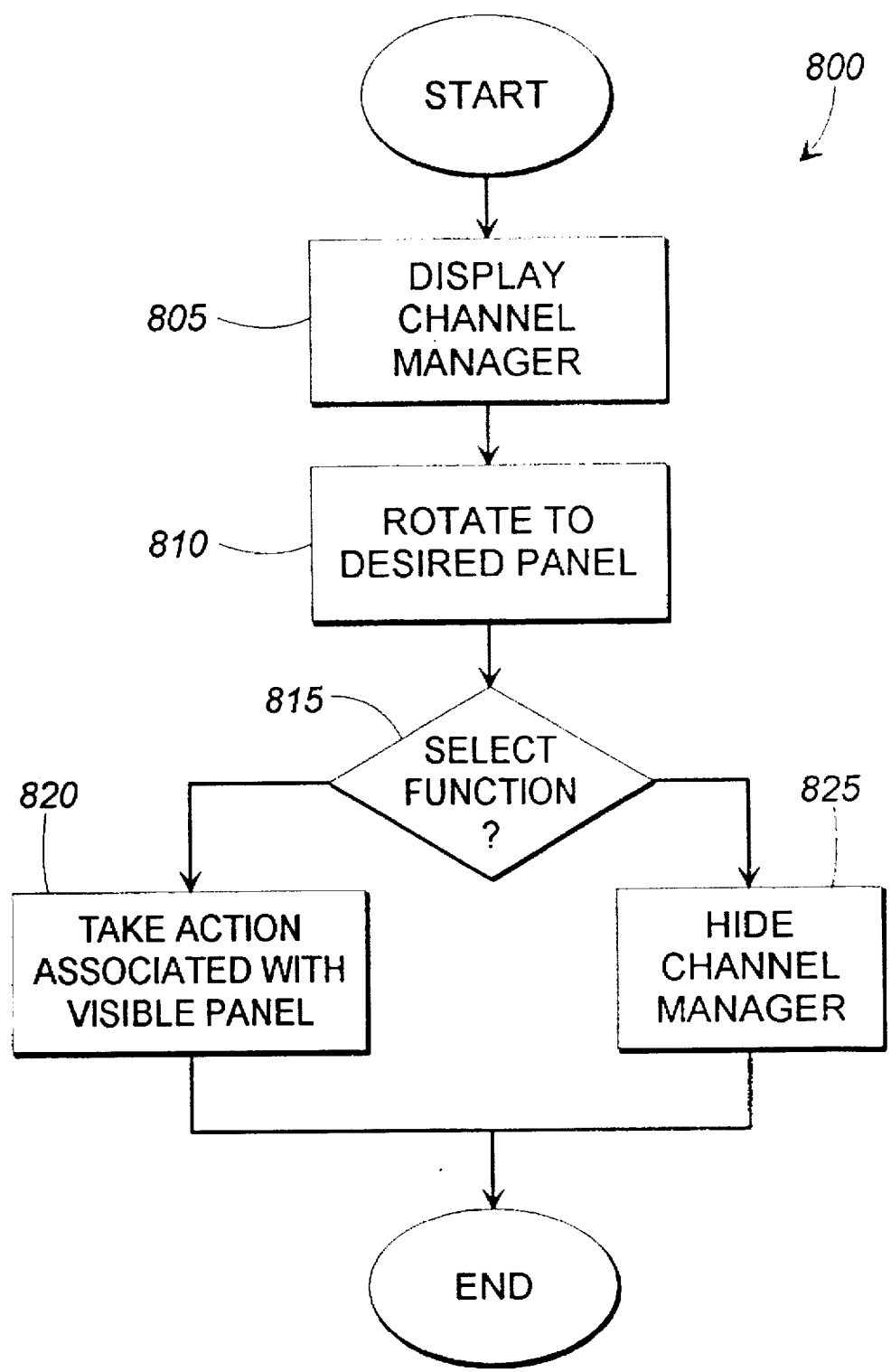
FIG. 8 is a flow diagram illustrating the steps taken by the viewer when using the remote control unit to manipulate the channel manager of FIG. 5.
Figure 9:
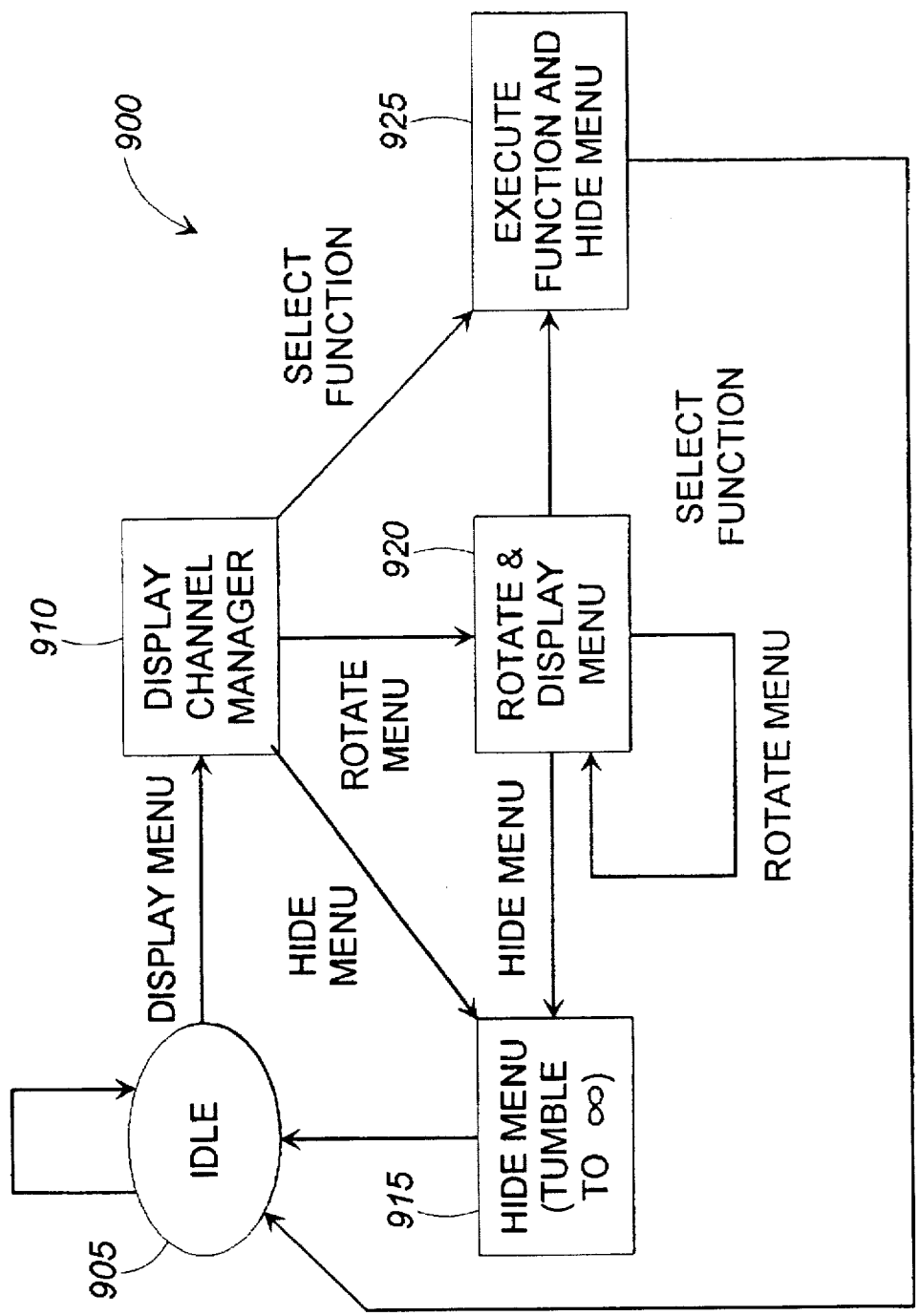
FIG. 9 is a state diagram illustrating the method of the present invention as implemented by a program module running on the set-top terminal, which forms a part of the interactive network system.
Figure 10:
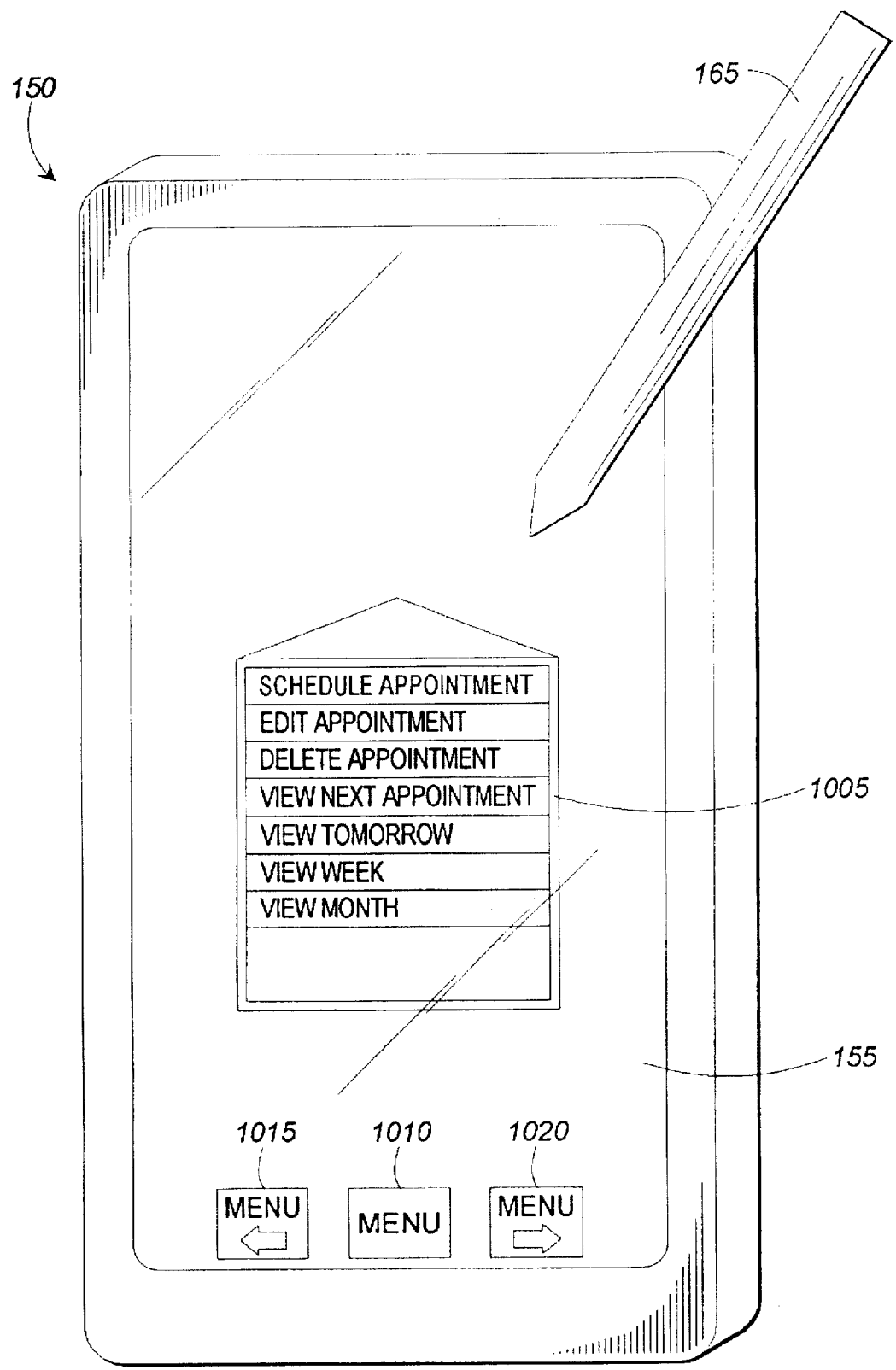
FIG. 10 illustrates the position of a menu control object on the display of a pen-based hand held computer.
Figure 11:
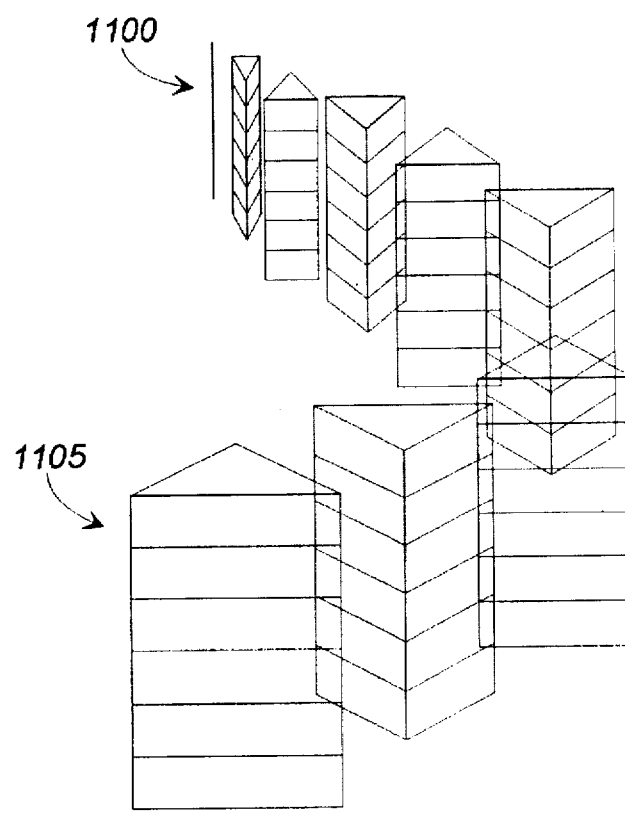
FIG. 11 illustrates an open transition for the menu control object of FIG. 10.
Figure 12:
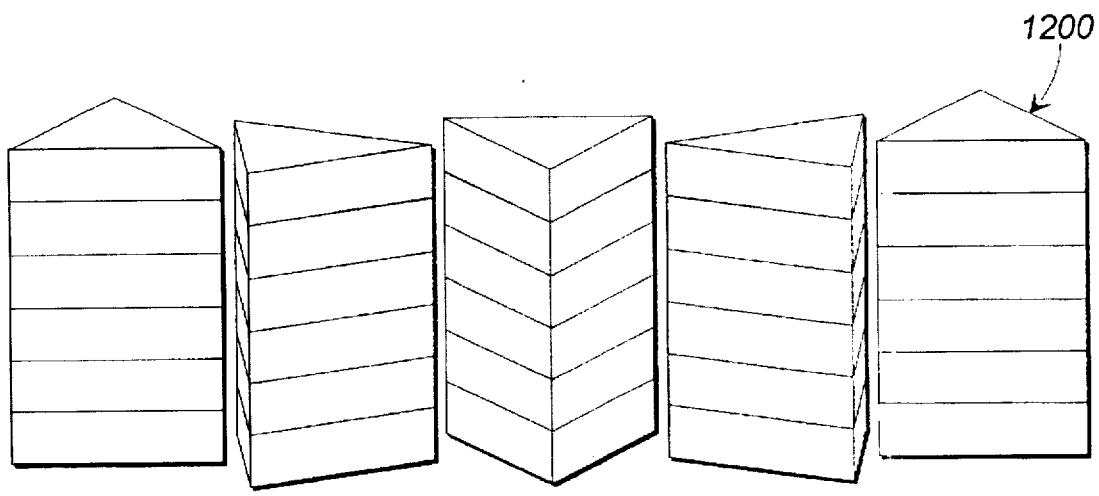
FIG. 12 illustrates a transition between panels on the menu control object of FIG. 10.
Figure 13:
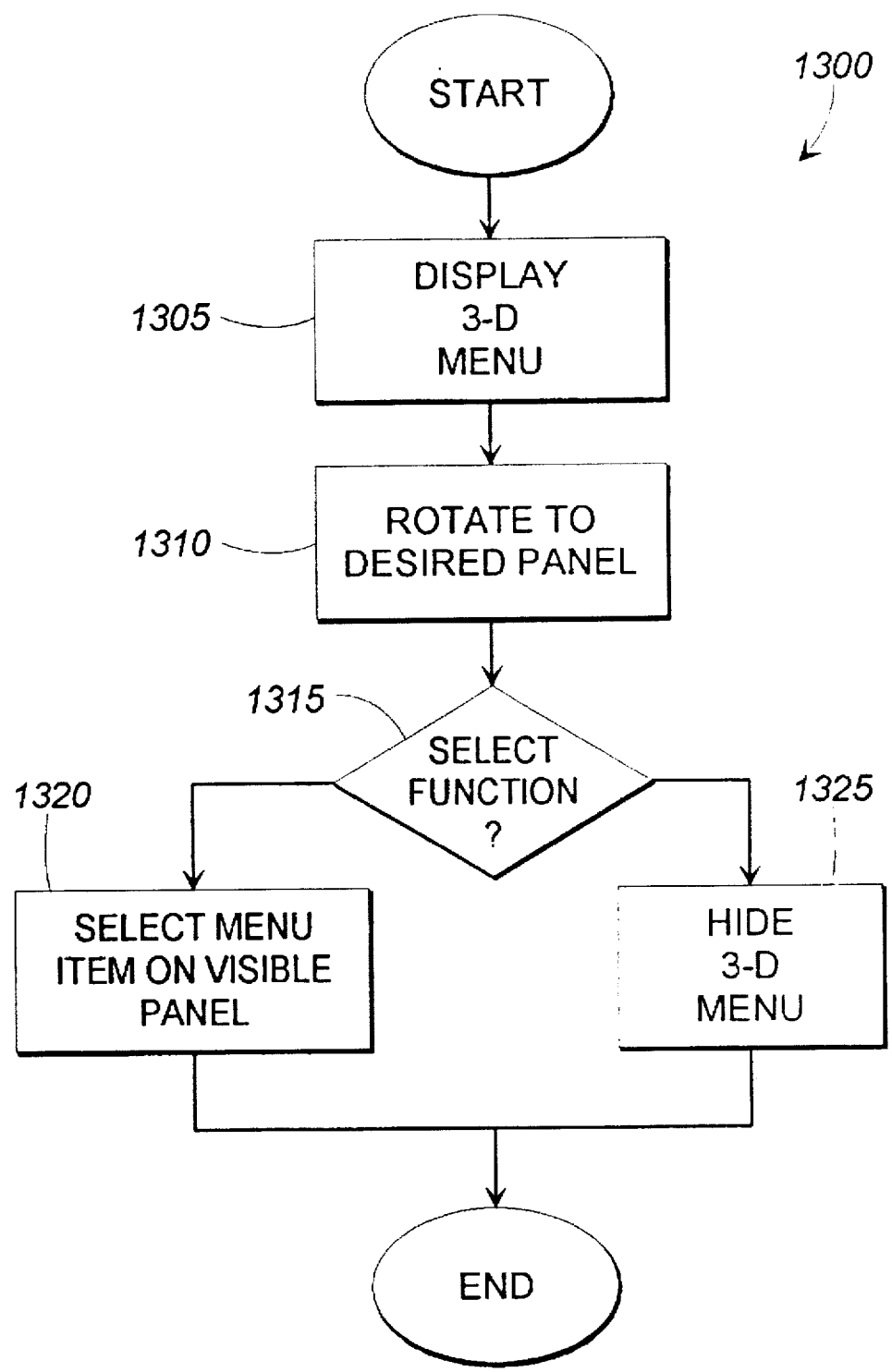
FIG. 13 is a flow diagram illustrating the steps taken by the user in order to use the utilize the menu control object of FIG. 10
Figure 14:
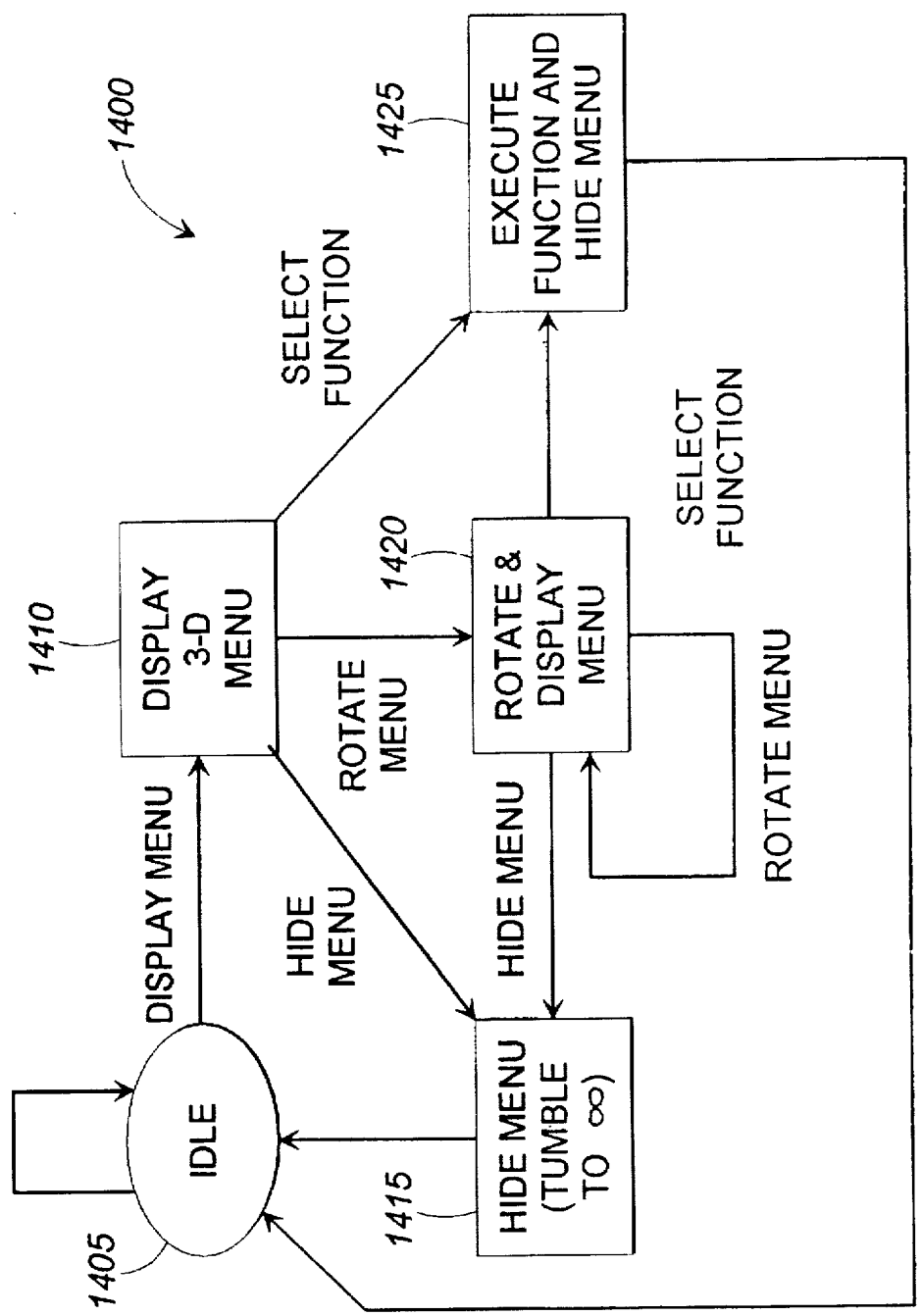
FIG. 14 is a state diagram illustrating the method of the present invention as implemented by a program module running on the hand held computer of FIG. 4.

Turning now to FIGS. 5–14, the preferred method for displaying data and control objects will be described. FIGS. 5–9 illustrate the preferred method for displaying data and control objects in the interactive TV environment. FIG. 5 illustrates the position of a channel manager object on a monitor. FIG. 6 illustrates an open transition for the channel manager. FIG. 7 illustrates a transition between panels on the channel manager. FIG. 8 is a flow diagram illustrating the steps taken by the viewer in order to use the utilize the channel manager. FIG. 9 is a state diagram illustrating the method of the present invention as implemented by a program module running on the set-top terminal. FIGS. 10–14 illustrate the preferred method for displaying data and control objects on a hand held computer. FIG. 10 illustrates the position of a menu control object on the display. FIG. 11 illustrates an open transition for the menu control object. FIG. 12 illustrates a transition between panels on the menu control object. FIG. 13 is a flow diagram illustrating the steps taken by the user in order to use the utilize the menu control object. FIG. 14 is a state diagram illustrating the method of the present invention as implemented by a program module running on the hand held computer.

Turning first to the interactive television environment, FIG. 5 illustrates the output device 50 and set-top terminal 48, which are located at a viewer's home or office. In the preferred interactive television system, the primary method for providing on-screen information and functionality to the viewer is a control object that is referred to as the channel manager 225, and is displayed in the lower right corner of the monitor (output device 50). The channel manager 225 is a collection of panels that act as a very simple menu. Each panel presents informational elements, controls, or combination of information and control elements. A purely informational menu could be used to describe the current state of the environment. The panels may be used to display virtually any type of information, including text, graphics, animation, and full motion video.

The specific number and type of panels displayed in the channel manager depend on how the channel manager is invoked and on what program is active when the channel manager was invoked. In the preferred system, there are six types of panels that can appear on the channel manager. Each panel provides information and a single action that is launched or initiated by pressing the action key on the remote control unit. Although the present invention is applicable regardless of the number and type of panels used, the preferred panels are described briefly below. In light of the flexibility provided by the present invention, this description of the preferred panels is provided by way of illustration only, and not by way of limitation.

In the preferred system, a program panel identifies the broadcast show or the application running on the current channel. The program panel can also communicate secondary information such as the time remaining on the program. If the viewer presses the action key while the program panel is open, the channel is replaced by a "what's on" dialog, which provides additional information on the current program.

A reminder panel displays program information for an upcoming program during a period of time immediately prior to the beginning of that program. If the viewer presses the action key while the reminder panel is visible, the set-top terminal will jump to the channel that will be showing the program.

A viewer panel displays the name of the current viewer and provides access to a viewer identification dialog to change the current viewer. By requiring the viewer to identify himself and enter a password, the system may be programmed to prevent some viewers (e.g., children) from watching certain types of programs or channels. If the viewer presses the action button while the viewer panel is visible, the channel manager is dismissed and the viewer identification dialog is displayed.

A volume panel is used to provide feedback for the remote control unit's volume key. This panel appears in response to pressing the volume up or volume down keys on the remote control unit. The volume panel remains visible until a predetermined period of time has elapsed, or some other action is taken.

A mute panel provides feedback information for the remote control unit's mute key. The mute panel remains visible until a predetermined period of time has elapsed, the mute key is pressed again, or some other action is taken.

Application panels are used to provide information regarding applications that are available through the interactive television network system. Examples of applications available via the interactive system include electronic program guides and video on demand services. If the viewer presses the action button while viewing an application panel, the application is responsible for providing a resulting action.

Those skilled in the art will appreciate that an object consisting of multiple panels can be displayed in a variety of ways. For example, all of the panels can be displayed simultaneously by placing one above the other on the monitor. Alternatively, one panel may simply be replaced with a new panel as the viewer navigates through the available panels. Although simultaneously displaying all of the panels provides the viewer with all of the available information, it has the disadvantage of taking up a lot of screen space. While displaying only one panel at a time conserves screen space, it does not provide the viewer with any contextual clues regarding the existence of the other available panels.

The present invention overcomes these problems by providing a three-dimensional channel manager object, which conserves screen space while also indicating the presence of the other panels. This is accomplished by providing animated three-dimensional images during the channel manager's open, close, and panel transitions. The three-dimensional animation of the present invention clearly depicts an object that has more than one panel or face, thus providing valuable information or clues to the viewer. The open and panel transitions are illustrated in FIGS. 6 and 7, respectively.

FIG. 6 provides a series of images that illustrate an exemplary open transition, which occurs when the channel manager is activated. Generally described, the open transition depicts a three-dimensional hexahedron tumbling and rotating about an axis as it moves from infinity to its final position on the monitor. Thus, when the menu key is pressed, the channel manager object appears as a small, distant image at an initial position 600 on the monitor. The image increases in size and rotates about an axis as it moves from the initial position 600 to its final position 605 at the bottom right corner of the monitor (as illustrated in FIG. 5). As the object rotates, it clearly shows the viewer that it includes more than one panel. In the preferred system, the channel manager object appears as a rectangular two-dimensional object when it is displayed in its final position. However, those skilled in the art will understand that the channel manager could be displayed as a three dimensional object shown in perspective or orthogonal view. The close transition, which occurs when the channel manager is dismissed, is the opposite of the open transition, and provides a rotating, tumbling object that moves from final position 605 to initial position 600.

FIG. 7 illustrates an exemplary panel-to-panel transition. This occurs when the viewer uses the directional control on the remote control unit to move from one panel to another, or when the channel manager object is already visible and another function is pressed. In the preferred system, three-dimensional animation is used to depict a multi-sided object rotating from along its major axis to reveal another panel. In the sequence of FIG. 7, the channel manager initially displays program panel 705. When the viewer presses the directional control, the channel manager rotates downward to display the volume panel 710 and conceal the program panel 705.

To achieve the desired transitional effect and to convince the viewer that the object is a three-dimensional representation, techniques such as texture mapping and real-time three-dimensional graphics and animation may be employed. Those skilled in the art will appreciate that the open, close and panel transitions can be displayed in one of two ways: pre-rendered or dynamically. Pre-rendered transition uses animation that has been produced and stored before it is being displayed to the viewer. Such animation is displayed by using multiple images or sequential movie clips. Pre-rendered transitions cannot be altered at run-time. Alternatively, dynamic transitions are generated by three-dimensional models and drawing routines. Dynamic transitions are generated when the animation is required and can be altered and tailored to fit any situation at any moment. This is particularly useful in the context of the present invention if the channel manager is constantly changing to reflect different states of operation. Likewise, the principles of the present invention may be applied to display objects having various numbers of panels, and the animation may show any type of motion, including the rotating and tumbling effects shown in FIGS. 6 and 7.

From FIGS. 6 and 7, various features and advantages of the present invention are apparent. Generally described, a multisided object having a plurality of panels, and a panel-to-panel transitional animation are displayed to the viewer. The channel manager panels are presented as part of a three-dimensional structure. Each is connected to another to form the completed object. The viewer can use the remote control unit to spin the object and to reveal additional panels. As each panel is revealed, the channel manager is animated to show the spinning of the object structure and the relationship between menu panels. Because the object is three-dimensional and because the viewer perceives it as so, it is easy to understand that the object consists of and can present more than one panel.

FIG. 8 is a flow diagram that illustrates the method of the present invention in terms of the steps carried out by the viewer. The flow diagram summarizes the steps that are described above in conjunction with FIGS. 6 and 7.

The method 800 of the present invention begins at step 805 when the viewer presses the menu button on the remote control unit. At that point, the channel manager object appears on the monitor as a small, distant object, and moves to its final position in the manner described in conjunction with FIG. 6. As mentioned above, an advantage of the present invention is that the open transition reveals the presence of multiple panels, and indicates that the channel manager is capable of displaying the other panels.

At step 810 the viewer uses the directional control on the remote control unit to rotate the channel manager object until the desired panel is visible. For each transition between panels that is directed by the viewer, the system displays a rotating three-dimensional object as was described in FIG. 7. The present invention provides the advantage of using the panel-to-panel transitions to again reveal the three-dimensional nature of the channel manager.

At step 815, the viewer determines whether to take some action associated with the visible panel, or to dismiss the channel manager object. If the viewer wishes to launch a function or activity associated with the visible panel, the viewer would proceed to step 820 and press the action key on the remote control unit. Examples of the actions that are taken in response to the actuation of the action key are provided above in conjunction with the description of the preferred panels. If the viewer is through with the channel manager, the viewer may proceed to step 825 and dismiss the channel manager object by pressing the menu button on the remote control unit. When the channel manager object is dismissed, the system displays three-dimensional animation of the channel manager object moving from its normal position to infinity. This animation is similar to the process described in conjunction with FIG. 6, but occurs in the opposite direction.

FIG. 9 is a state diagram illustrating the method 900 of present invention as implemented by an application program running on a set-top terminal. The purpose of the state diagram is to illustrate the interaction between input signals from the remote control unit and the program modules resident in the set-top terminal.

The preferred method 900 for displaying three-dimensional objects begins at the idle state 905. At this point, the channel manager object is not displayed on the monitor. Those skilled in the art will understand that the method 900 is associated with displaying the channel manager object only and that the interactive television system may perform any of a variety of functions while the method 900 is in its idle state.

As mentioned above, the set-top terminal receives various input signals from the remote control unit and responds to those input signals. At this point, it is helpful to consider that there are four types of relevant input signals from the remote control unit. These include opening the channel manager, closing the channel manager, rotating the channel manager, and launching a function from the channel manager. In response to these input signals, the set-top terminal will do one of four things, including display the channel manager, hide the channel manager, rotate the channel manager, and execute a function associated with the visible panel.

The method 900 remains in the idle state 905 until the signal from the remote control unit pertains to the channel manager and one of the panels described above.

The method 900 leaves the idle state 905 when the input signal from the remote control unit indicates that the viewer has pressed the menu button. When this occurs, the method proceeds to state 910, and causes the system to display the channel manager object using the three-dimensional open transition animation described above. As mentioned above, displaying the channel manger may involve retrieving and displaying pre-rendered images, or dynamically creating the animation using information associated from the current status of the system.

The method 900 remains in state 910 until the viewer hides or rotates the channel manager, or launches a function associated with the visible panel. If the viewer presses the menu key, the method proceeds to state 915, and causes the system to dismiss the channel manager object. This is accomplished using the close transition animation described above. From state 915, the method returns to the idle state 905.

If, at state 910, the viewer uses the directional control, the method proceeds to step 920, and causes the channel manager object to rotate in the direction indicated by the directional control. The channel manager rotates in the manner described in conjunction with FIG. 7 to reveal an adjacent panel. From state 920, the method will advance to state 915 if the viewer presses the menu button, or return to state 920 if the directional control is used to rotate the channel control object again.

From states 910 or 920 the viewer may use the action button on the remote control unit to initiate one of the predetermined functions described above. Once the action key is pressed, the method proceeds to step 925, where the system initiates the desired function and dismisses the channel manager. From state 925, the method returns to the idle state 905.

Turning now to the hand held computer environment, FIG. 10 illustrates the hand held computer 15, display 155, and stylus 165. In the preferred hand held computer, a method for providing on-screen information and functionality to the viewer is a control object that is referred to as a three-dimensional menu 1005. The three-dimensional menu 1005 is displayed on the display 155 as a three-dimensional object. The hand held computer also displays three control buttons. A menu button 1010 is used to open and close the three-dimensional menu. A rotate left button 1015 and rotate right button 1020 are used to rotate the three-dimensional menu 1005 in order to reveal hidden panels. The three-dimensional menu 1005, menu button 1010 and rotation buttons 1015, 1020 are actuated by tapping the object with the stylus. Alternatively, those skilled in the art will understand that the menu and/or rotate buttons may be implemented as hardware buttons that are positioned on the case of the hand held computer, and connected to the input/output circuit.

Like the channel manger that was described above, the three-dimensional menu 1005 is a collection of panels. It is used to present unique menu lists on each panel. Each list contains multiple menu items that can be selected by the user. In FIG. 10, the front panel of the three-dimensional menu includes menu items associated with a calendar program that runs on the hand held computer. Those skilled in the art will appreciate that the three-dimensional menu of present invention can be used to display a variety of information, including menu items associated with any program that runs on the hand held computer. The specific number of panels and the associated menu items depend on the specific program modules that are running on the hand held computer.

The present invention conserves display space and provides contextual clues by providing a three-dimensional menu object. The presence of the other panels is also indicated by providing animated three-dimensional images during the menu's open, close, and panel transitions. The three-dimensional animation of the present invention clearly depicts an object that has more than one panel or face, thus providing valuable information or clues to the viewer. The open and panel transitions are illustrated in FIGS. 11 and 12, respectively.

FIG. 11 illustrates a sequence of images that form a part of an exemplary open transition, which occurs when the three-dimensional menu is activated. Generally described, the open transition depicts a three-dimensional menu rotating about it's vertical axis as it moves from infinity to its final position on the display. Thus, when the menu button 1010 (FIG. 10) is tapped with the stylus, the three-dimensional menu object appears as a small, distant image at an initial position 1100 on the display. The image increases in size and rotates about the vertical axis as it moves from the initial position 1100 to its final position 1105. As the object rotates, it clearly shows the viewer that it includes more than one panel. The close transition, which occurs when the three-dimensional menu is dismissed, is the opposite of the open transition, and provides a rotating, tumbling object that moves from final position 1105 to initial position 1100.

FIG. 12 illustrates an exemplary panel-to-panel transition. This occurs when the user uses the stylus to tap the direction control buttons on the display. In the preferred hand held computer, three-dimensional animation is used to depict a multi-sided object 1200 rotating from along its vertical axis to reveal another panel.

To achieve the desired transitional effect and to convince the viewer that the object is a three-dimensional representation, the hand held computer employs techniques such as texture mapping and real-time three-dimensional graphics and animation. Those skilled in the art will appreciate that the open, close and panel transitions can be displayed in one of two ways: pre-rendered or dynamically. Pre-rendered transition uses animation that has been produced and stored before it is being displayed to the viewer. Such animation is displayed by using multiple images or sequential movie clips. Pre-rendered transitions cannot be altered at run-time. Alternatively, dynamic transitions are generated by three-dimensional models and drawing routines. Dynamic transitions are generated when the animation is required and can be altered and tailored to fit any situation at any moment.

From FIGS. 11 and 12, various features and advantages of the present invention are apparent. Generally described, a multisided object having a plurality of panels, and a panel-to-panel transitional animation are displayed to the viewer. The menu panels are presented as part of a three-dimensional structure. Each is connected to another to form the completed object. The viewer can use the stylus to rotate the object to reveal additional panels. As each panel is revealed, the three-dimensional menu is animated to show the spinning of the object structure and the relationship between menu panels. Because the object is three-dimensional and because the viewer perceives it as so, it is easy to understand that the object consists of and can present more than one panel.

FIG. 13 is a flow diagram that illustrates the method of the present invention in terms of the steps carried out by the viewer. The flow diagram summarizes the steps that are described above in conjunction with FIGS. 11 and 12.

The method 1300 of the present invention begins at step 1305 when the user taps the menu button on the hand held computer's display. At that point, the three-dimensional menu object appears on the display as a small, distant object, and moves to its final position in the manner described in conjunction with FIG. 11. As mentioned above, an advantage of the present invention is that the open transition reveals the presence of multiple panels, and indicates that the three-dimensional menu is capable of displaying the other panels.

At step 1310 the viewer uses the directional control on the remote control unit to rotate the three-dimensional menu object until the desired panel is visible. For each transition between panels that is directed by the viewer, the system displays a rotating three-dimensional object as was described in FIG. 12. The present invention provides the advantage of using the panel-to-panel transitions to again reveal the three-dimensional nature of the three-dimensional menu.

At step 1315, the viewer determines whether to select one of the items on the displayed menu panel, or to dismiss the three-dimensional menu object. If the viewer selects an item from the visible panel, the viewer proceeds to step 1320 and taps the desired menu item. If the viewer is through with the three-dimensional menu, the viewer may proceed to step 1325 and dismiss the three-dimensional menu object by tapping the menu button with the stylus. When the three-dimensional menu object is dismissed, the system displays three-dimensional animation of the three-dimensional menu object moving from its normal position to infinity. This animation is similar to the process described in conjunction with FIG. 11, but occurs in the opposite direction.

FIG. 14 is a state diagram illustrating the method 1400 of present invention as implemented by an application program running on a hand held computer. The purpose of the state diagram is to illustrate the interaction between input signals from pressure sensitive display and the program modules resident in the hand held computer.

The preferred method 1400 for displaying three-dimensional objects begins at the idle state 1405. At this point, the three-dimensional menu is not displayed by the hand held computer. Those skilled in the art will understand that the method 1400 is associated with displaying the three-dimensional menu object only and that the hand held computer may perform any of a variety of functions while the method 1400 is in its idle state.

At this point, it is helpful to consider that there are four types of relevant input signals from the pressure sensitive display. These include opening the three-dimensional menu, closing the three-dimensional menu, rotating the three-dimensional menu, and selecting a menu item from the three-dimensional menu. In response to these input signals, the hand held computer will do one of four things, including display the three-dimensional menu, hide the three-dimensional menu, rotate the three-dimensional menu, and execute a function associated with the visible panel. The method 1400 remains in the idle state 1405 until the user inputs a signal pertaining to the three-dimensional menu.

The method 1400 leaves the idle state 1405 when the user taps the menu button on the pressure sensitive display. When this occurs, the method proceeds to state 1410, and causes the hand held computer to display the three-dimensional menu object using the three-dimensional open transition animation described above. As mentioned above, displaying the menu may involve retrieving and displaying pre-rendered images, or dynamically creating the animation using information associated from the current status of the system.

The method 1400 remains in state 1410 until the user hides or rotates the three-dimensional menu, or selects a menu item associated with the visible menu panel. If the user taps the menu key, the method proceeds to state 1415, and causes the hand held computer to dismiss the three-dimensional menu object. This is accomplished using the close transition animation described above. From state 1415, the method returns to the idle state 1405.

If, at state 1410, the user taps the directional control buttons, the method proceeds to step 1420, and causes the three-dimensional menu object to rotate in the direction indicated by the directional control. The three-dimensional menu rotates in the manner described in conjunction with FIG. 12 to reveal an adjacent panel. From state 1420, the method will advance to state 1415 if the viewer presses the menu button, or return to state 1420 if the directional control is used to rotate the channel control object again.

From states 1410 or 1420 the user may tap a menu item on the displayed panel to initiate a desired function. Once the menu item is tapped, the method proceeds to step 1425, where the hand held computer performs the desired function and dismisses the three-dimensional menu. From state 1425, the method returns to the idle state 1405.

From the foregoing description, it will be appreciated that the present invention provides an efficient method for displaying objects having multiple panels, and for providing contextual clues regarding the existence of multiple panels. The method of the present invention employs high quality three-dimensional images and animation to display three-dimensional object. The three-dimensional animation is employed during open and close transitions, and during panel-to-panel transitions. Thus, the present invention provides an improved method for displaying menu objects.

The present invention also provides an interactive system for displaying object having multiple panels. The system includes a central processing unit (CPU), a display coupled to the CPU for displaying information, and an input device coupled to the CPU for providing input signals. The CPU is operative to display objects having multiple panels, and for providing contextual clues regarding the existence of multiple panels. The system of the present invention employs three-dimensional images and animation to display three-dimensional object. The three-dimensional animation is employed during open and close transitions, and during panel-to-panel transitions.

The present invention has been described in relation to particular embodiments which are intended in all respects to be illustrative rather than restrictive. For example, although the present invention has been described in the context of an interactive television system and a hand held computer, those skilled in the art will understand that the principles of the present invention may be applied to, and embodied in, any type of interactive computing device, including general purpose computers, personal computer, notebook computers, etc.

Alternative embodiments will become apparent to those skilled in the art to which the present invention pertains without departing from its spirit and scope. Accordingly, the scope of the present invention is defined by the appended claims rather than the foregoing description.

What is claimed is:

1. In an interactive system including a display and an input device and having a graphical user interface, a method for displaying a three-dimensional object having a plurality of panels, comprising the steps of:

receiving a first input signal;

displaying, in response to the first input signal, an opening transition in which the object moves from an initial position and initial orientation to a final position and final orientation, the opening transition revealing the plurality of panels associated with the object;

displaying the object at the final position in the final orientation, the object being displayed as a two-dimensional object with only the first panel visible on the display;

receiving a second input signal; and rotating, in response to the second input signal, the object so that a second panel of said plurality of panels is visible on the display.

2. The method of claim 1, wherein the object has an initial size in the initial position and a final size in the final position, and the final size is larger than the initial size.

3. The method of claim 1, wherein the transition from the initial position to the final position comprises rotating the object about an axis.

4. The method of claim 1, wherein the plurality of panels present informational elements, controls, or a combination of information and controls.

5. The method of claim 1, wherein the interactive system comprises a set top terminal of an interactive television system, and the input device comprises a remote control unit.

6. The method of claim 1, wherein the interactive system comprises a hand held computer, the output device comprises a touch sensitive display, and the input device comprises a stylus for interacting with the touch sensitive display.

7. The method of claim 1, wherein the interactive system comprises a general purpose computer, and the input device is selected from a group comprising a mouse, a keyboard, a trackball, and a track pad.

8. A computer-readable medium having computer-executable instructions for performing steps comprising:

displaying, in response to a first input signal, an object at an initial position and in an initial orientation, the object having an initial size in the initial position;

transitioning the object from the initial position and initial orientation to a final position and final orientation, the transition revealing a plurality of panels associated with the object;

displaying the object at the final position in the final orientation, the object having a final size in the final position, the final size being larger then the initial size, and the object being displayed as a two-dimensional object with only the first panel visible on the display; and rotating, in response to a second input signal, the object so that a second panel of said plurality of panels is visible on the display.

9. The computer-readable medium of claim 8, wherein the transition from the initial position to the final position comprises rotating the object about an axis.

10. The computer-readable medium of claim 8, wherein the computing device comprises a set top terminal of an interactive television system, and the input device comprises a remote control unit.

11. The computer-readable medium of claim 8, wherein the computing device comprises a hand held computer, the output device comprises a touch sensitive display, and the input device comprises a stylus for interacting with the touch sensitive display.

12. The computer-readable medium of claim 8, wherein the computing device comprises a general purpose computer, and the input device is selected from a group comprising a mouse, a keyboard, a trackball, and a track pad.

13. An interactive computer system for displaying a selectively controllable object including a plurality of panels, comprising:

a processing unit;

a memory device coupled to the processing unit for storing program modules executed by the processing unit;

an output device coupled to the processing unit for displaying information; and an input device coupled to the processing unit for providing input signals;

the processing unit, responsive to instructions from a program module running on the computer system, being operative to:

receive a first input signal;

display, in response to the first input signal, the object at an initial position and in an initial orientation;

transition the object from the initial position and initial orientation to a final position and final orientation, the transition revealing the plurality of panels associated with the object;

display the object at the final position in the final orientation, the object being displayed as a two-dimensional object with only a first panel of the plurality of panels visible on the display;

receive a second input signal;

rotate, in response to the second input signal, the object so that a second panel of said plurality of panels is visible on the display.

14. The interactive computer system of claim 13, wherein the object has an initial size in the initial position and a final size in the final position, and the final size is larger than the initial size.

15. The interactive computer system of claim 13, wherein the transition from the initial position to the final position comprises rotating the object about an axis.

16. The interactive computer system of claim 13, wherein the plurality of panels present informational elements, controls, or a combination of information and controls.

17. The interactive computer system of claim 13, wherein the interactive computer system comprises a set top terminal of an interactive television system, and the input device comprises a remote control unit.

18. The interactive computer system of claim 13, wherein the interactive computer system comprises a hand held computer, the output device comprises a touch sensitive display, and the input device comprises a stylus for interacting with the touch sensitive display.

19. The interactive computer system of claim 13, wherein the interactive computer system comprises a general purpose computer, and the input device is selected from a group comprising a mouse, a keyboard, a trackball, and a track pad.

* * * * *